3,825,482
ION-SELECTIVE ELECTRODES USING TUNGSTEN BRONZES AS ACTIVE ELEMENT
Margaret A. Wechter, Hammond, Ind., and Howard R. Shanks, Ames, Iowa, assignors to Iowa State University Research Foundation, Inc., Ames, Iowa
Filed Feb. 16, 1972, Ser. No. 226,862
Int. Cl. G01n 27/46
U.S. Cl. 204—195 M   6 Claims

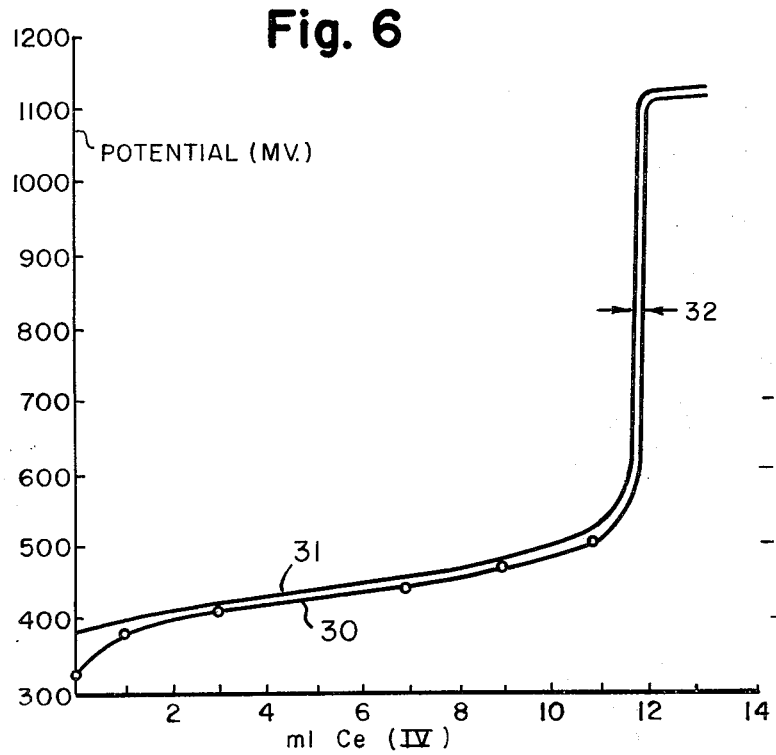
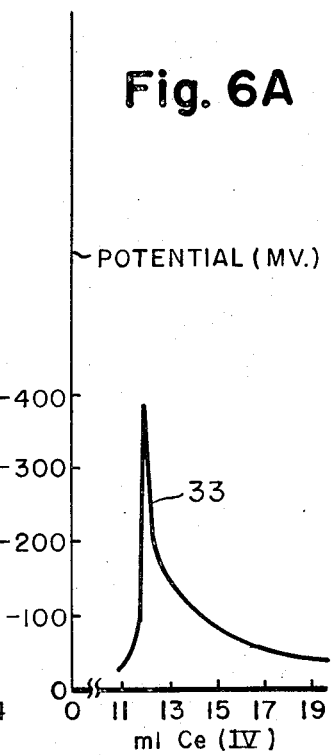
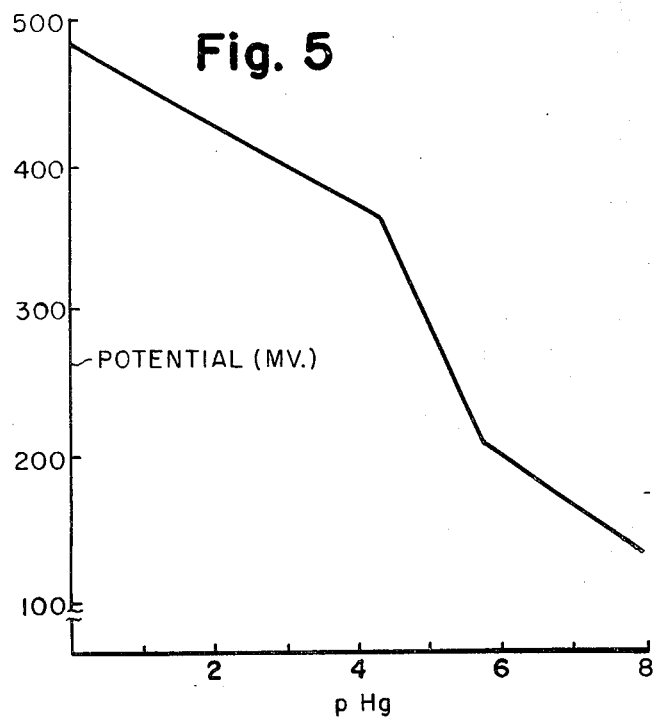

ABSTRACT OF THE DISCLOSURE

Tungsten bronzes, which are compounds having a general formula $A_xWO_3$ where $x$ is any value between zero and one exclusive have been found to function as the active element in ion-selective electrodes. They have been found to be sensitive to mercury, silver and iron in solution.

BACKGROUND AND SUMMARY

This invention described herein was made in the course of, or under, a contract with the United States Atomic Energy Commission.

The present invention relates to electrochemical cells; and in particular it relates to cells with an ion-selective electrode.

In a cell of the type with which the present invention is concerned, there are two electrodes. One is the ion-selective electrode, sometimes referred to as the indicator electrode; and it is responsive to the presence of particular, known ionic species. The other electrode is referred to as the reference electrodes, and it independent of the test solution composition—that is, the junction potential between the test solution and the reference electrode is, for all practical purposes the same for all solutions and ionic species, or at least a very large class of solutions and ionic species.

Heretofore, specific ion electrodes consisted of an insulating glass or plastic tube sealed at one end with a membrane. The tube usually contains a solution of the ion to be measured and a calomel or silver-silver chloride internal reference electrode. A voltmeter or electrometer is used to measure the potential developed between the specific ion electrode and an external reference electrode when the pair is immersed in a solution. The selectivity of these systems depends on the characteristics of the membrane which functions as a barrier, permitting diffusion only of the desired ion between the solution under study and the internal or reference solution. The diffusion results from a difference in activity between the two solutions. When the activity of the ion in the sample solution exceeds that in the reference solution, there is a net diffusion of ions into the indicator electrode. The movement of ions continues until a state of equilibrium is reached, at which point the electrical potential developed across the membrane prevents a further net diffusion of ions. The value of the potential across the membrane at equilibrium varies with the concentration of the ion in the sample, as determined by the Nernst equation, in theory. In practice, the electrode is calibrated with one or more solutions of known activity, so that the direct measurement of potential in an unknown solution gives the ion activity directly.

The discovery that certain types of glass would transmit the hydrogen ion and, at the same time, act as a barrier to other ions led to the development of the pH electrode. Later discoveries that other glasses would permit the diffusion of sodium and potassium ions, resulted in the design of electrodes for these specific ions.

Currently, there are available ion-selective electrodes for measuring the activity of many different types of ions, both cations and anions, and there are many different types of membranes including glass, single crystal or polycrystalline membranes, liquid ion-exchange membranes, and various heterogeneous membranes, for example, an enzyme-substrate membrane. The state of the art has been reviewed in an article by Durst entitled "Ion-Selective Electrodes in Science, Medicine, and Technology," American Scientist, May–June, 1971, pp. 353–361 and in an article by Weber entitled "Specific Ion Electrodes in Pollution Control," American Laboratory, July 1970, p. 15.

We have discovered that certain electrodes, described more fully within, may be employed in electro-chemical cells which are sensitive to particular ionic species. These cells include an indicator electrode and a reference electrode which are placed directly into the solution of interest, and an electrometer or voltmeter for measuring the potential between the two electrodes. The reference electrode may be conventional calomel or silver-silver chloride.

Specifically, we have discovered that tungsten bronzes with the formula $A_xWO_3$, where $x$ has any value between zero and one exclusive, are sensitive to ionic silver, mercury and iron.

The word "bronze" as used herein refers to a group of compounds of the general formula $A_xBO_3$. Tungsten bronze refers to $A_xWO_3$. These bronzes are different from, and have no connection with the "classical bronze" metals based on copper alloys. In general, the values of $x$ for the various bronzes are substantially continuously variable between zero and one. Several different crystal structures are observed in the system, however, such as cubic tetragonal, hexagonal and orthorhombic. The structure observed depends upon the value of $x$ for the composition of a given crystal.

We have found that electrochemical cells constructed according to the present invention have a wide range of uses including determining the end point of a titration, measuring the quantity of a metallic ion in solution, and in following the progress of oxidation-reduction reactions. Further, by using two separate indicator electrodes, rather than one indicator electrode and a reference electrode, in following an oxidation-reduction reaction, or a neutralization reaction, we are able to generate a difference curve which very clearly defines the end point of the reaction.

The use of tungsten bronze electrodes for purposes for catalysis in fuel cells and the like has been reported in the literature. However, the utility of these materials as indicator electrodes in ion-specific cells has heretofore been unknown, and it does not involve any catalytic action. Further, the indicator electrodes of prior ion-selective cells are often fragile and expensive; whereas the electrodes described herein are sturdy, versatile and of a solid-state construction, thereby affording significant advantages over prior constructions.

Without intending to so limit our invention, we hypothesize that the surface of the crystalline indicator electrode permits the reduction of specific ions, and it is at this surface that the differential potential is generated.

Other features and advantages of the present invention will be apparent to persons skilled in the art from the following detailed description of various embodiments, accompanied by the attached drawing.

THE DRAWING

FIG. 5 is a plot of the concentration of mercury (II) ion versus the electrode potential during stepwise additions;

FIG. 6 shows two plots of cell voltage during the oxidation-reduction reaction between Fe (II) and Ce (IV) with separate active electrodes; and FIG. 6A is a plot of cell voltage during the oxidation-reduction reaction between Fe (II) and Ce (IV) taken with a cell having two active electrodes.

DETAILED DESCRIPTION

Figure 1:
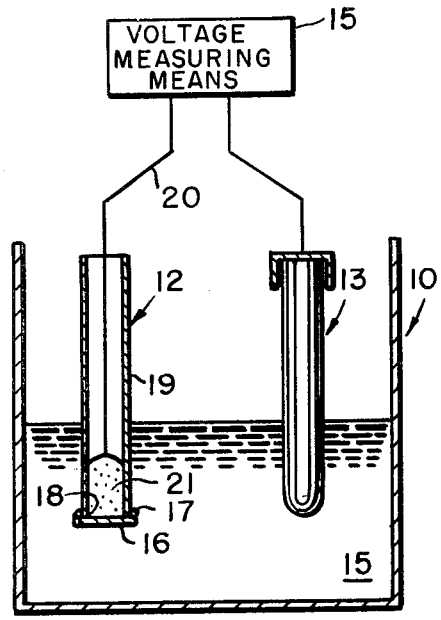
FIG. 1 is a schematic diagram of an ion-specific electrochemical cell incorporating the present invention.

FIG. 1 is a schematic representation of an electrochemical cell which is constructed according to the present invention. Such a cell is generally designated by the numeral 10. It includes an indicator electrode 12, a reference electrode 13, and voltage measuring means functionally illustrated by the block 15. The electrodes are immersed in the solution to be analyzed which is denoted 16. Depending upon the measurement desired to be taken, other apparatus can be included in a particular cell embodiment. For example, a salt bridge or a semi-permeable membrane separating the electrodes may be employed.

The indicator electrode 12 includes a tungsten bronze crystal denoted 16 and described more fully below. The crystal 16 is attached by means of an epoxy bead 17 to cover the lower end 18 of a cylindrical glass tube 19. A conductive wire 20 is fed from the voltage measuring means 15 through the tube 19 and makes contact with a body of mercury 21 which, in turn, is in electrical contact with the back of the crystal 16. Alternate forms of the indicator electrode may be equally well used. One alternate form might be to encase the crystal at the end of a solid plastic rod with a center conductor, and with the end of the rod polished to expose the crystal. The wire, of course, would have to be in electrical contact with the crystal. The reference electrode 13 is used to complete the electrical circuit, and it may be of conventional calomel material or silver/silver chloride. Alternatively, the eltctrode 13 may be an active electrode such as a platinum, depending upon the function of a particular cell, as will be made clear below.

The single tungsten bronze crystal 16 used as the active component of the indicator electrode 12 are preferably made by fused salt electrolysis of the appropriate tungstate and $WO_3$. That is, for example, in making sodium tungsten bronze, sodium tungstate $Na_2WO_4$ is mixed in appropriate proportions with tungstic acid $WO_3$ in a crucible of electrical ceramic glazed on the interior with a lead-free glaze, and then heated until they melt (usually upwards of 700° C.). A current (approx. 50 ma.) is then passed between two electrodes in the molten mixture. For this purpose, a chromel wire may be used as the cathode and graphite may be used as the anode. The graphite is preferably connected to a thin wall metal tube with a covering sleeve of quartz. Oxygen is produced at the anode and the crystal is grown on the cathode.

Larger crystals may be grown by placing a small seed crystal in the melt as the electrode. A small hole may be drilled into one corner of the seed crystal in the direction of a diagonal. The seed crystal should have the appropriate $x$-value for the desired larger crystal. The size of the seed cube may be 3 to 4 mm. on a side, and it may be cut from a sample grown in the melt to be seeded. A wire is forced into the hole thus drilled and insulated with an Alundum tube.

As mentioned previously, the $x$ value in the general formula $A_xWO_3$ of these crystals may range between 0 and 1; and the crystals have been found to be responsive over this range, although the sensitivity may vary with $x$ due to the formation of different crystalline structures. The values of $x$ are determined either directly by neutron activation analysis or from the measurements of lattice constants. We have found that tungsten bronzes of all of the alkaline earth metals, except hydrogen exhibit this response. However, we prefer crystals of the following description: A is sodium and the crystalline structure is either Tetragonal I ($x$ is from 0.25 to 0.50) or cubic ($x$ is from 0.50 to 0.92); A is lithium and the crystal is orthorhombic ($x$ is from 0.03 to 0.20) or cubic ($x$ is from 0.25 to 0.50); A is potassium and the crystal is hexagonal ($x$ is from 0.23 to 0.33) or Tetragonal I ($x$ is from 0.34 to 0.70); A is rubidium and the crystal is hexagonal ($x$ is from 0.20 to 0.33). The response is also displayed by $ReO_3$ which has a cubic structure.

As mentioned, the particular form of the overall electrode may vary, but a clean, reproducible surface must be maintained on the crystal surface however. This can be obtained by treatment with a base such as $NH_3$ or NaOH. Alternatively, the surface can be cleaned and regenerated with an air-sand abrasive.

The utility and practice of the present invention can be appreciated more fully from a consideration of the specific examples set down below. These examples are provided by way of illustration and are not meant to in any way limit the invention disclosed herein.

Example I

Figure 2:
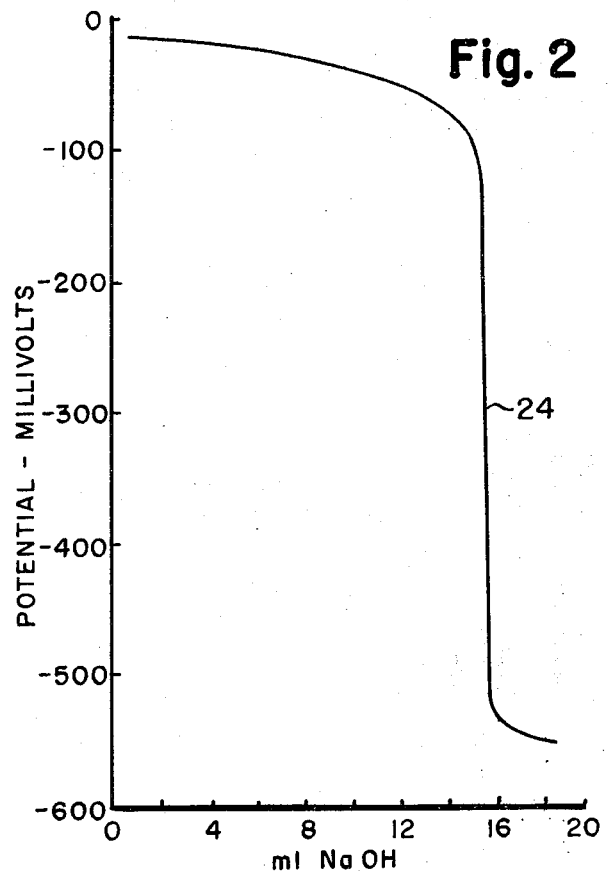
FIG. 2 is a plot of a titration curve obtained in the titration of 400 ml. of $3 \times 10^{-3}$ M $HClO_4$ with 0.1 M NaOH.

A tungsten bronze electrode was constructed according to the fused salt electrolysis technique described above. This indicator electrode had an active element of a single sodium tungsten bronze crystal (of cubic structure) of the formula $Na_xWO_3$ with an $x$ value of 0.712. The reference electrode was a standard saturated calomel electrode. This cell was used to measure the potential across two different chemical systems during titrations. First, 400 ml. of $3 \times 10^{-3}$ M $HClO_4$ was progressively titrated with 0.1 M NaOH. The curve, shown in FIG. 2, is a titration curve exhibiting the large break at the end point (indictated by the high negative shape at 24) which is expected in strong acid vs. strong base systems.

Figure 3:
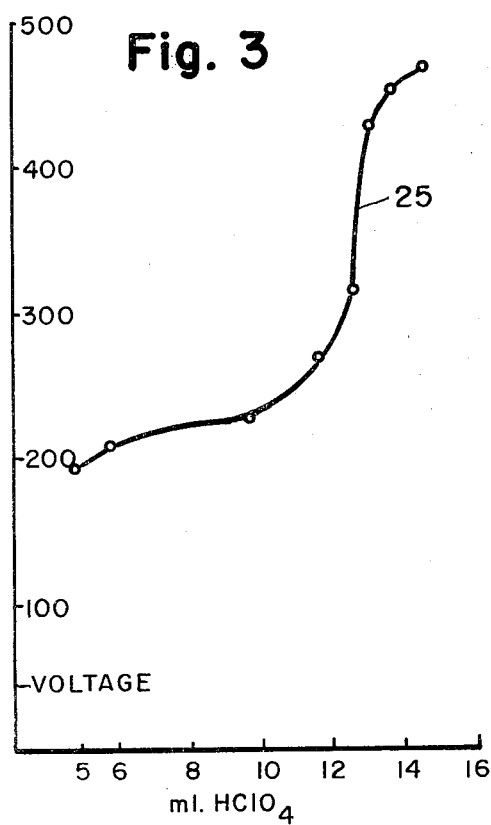
FIG. 3 is a plot of a titration curve obtained in the non-aqueous titration of 100 ml. of $1.5 \times 10^{-2}$ M aniline with 0.1 M $HClO_4$ in glacial acetic acid.

FIG. 3 represents the non-aqueous titration of 100 ml. of $1.5 \times 10$ M aniline with 0.1 M $HClO_4$ in glacial acetic acid. The plot of potential vs. ml. of titrant is typical for this system, the high positive slope at 25 representing this end point.

From these and other data obtained, it appears that the metal tungsten bronze electrodes function remarkably like the glass electrode for pH measurements. However, the bronze and glass electrodes were compared by immersing each in turn in a series of standard buffer solutions, and obtaining for each system a plot of pH vs. potential. A saturated calomel electrode was, in each case, used as the reference electrode. The conventional glass electrode system yielded the expected straight line graph, with a slope of approximately 59 mv./pH unit. On the other hand, the graph of the bronze system was curved, indicating that, under present conditions, at least, the pH response of the bronze electrodes is not linear. Several titrations were performed using both bronze and glass systems in solution. In each case $HClO_4$ was titrated with NoOH. The titration curves for the bronze-calomel system closely resembled those for the glass-calomel pair, except that the break at the end point for the former pair was 10–50 percent larger than that for the latter. It is thus apparent that the tungsten bronze electrodes can be used to follow pH titrations.

Another observation resulted from the titration of perchloric acid and acetic acid with 0.1 M NaOH. Approximately 200 ml. of $5 \times 10^{-3}$ M acid were titrated in each case. Curves were derived using glass vs. bronze electrodes and showed strong peaks at the end point representing first derivatives of normal titration curves.

Example II

Figure 4:
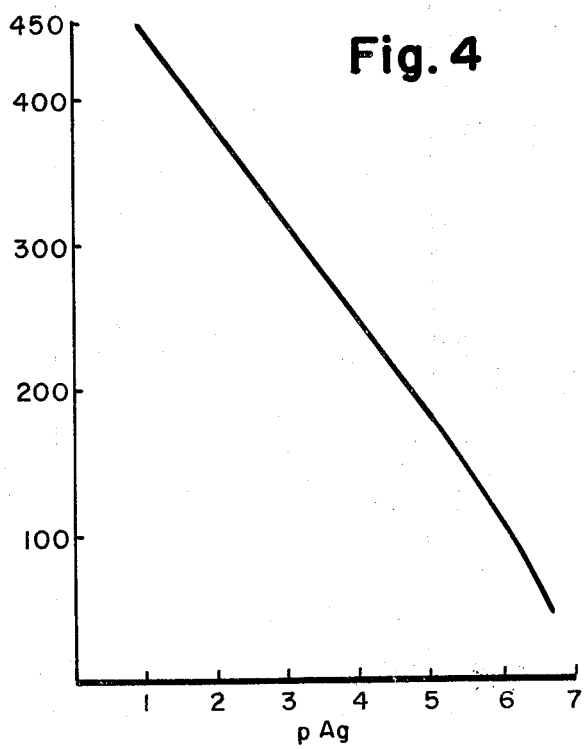
FIG. 4 is a plot of the concentration of silver ion versus the electrode potential during stepwise addition.

The same cell as described in Example I has also been discovered to be useful in measuring quantities of metal ion present in a solution. It appears that only those metal ions whose reduction potentials are positive with respect to the standard hydrogen reduction potential are measurable by this cell. No response was observed on the addition of metal ions of Groups IA, IIA, IIIA, and others whose reduction potentials are negative. However, for ions such as Ag(I), Hg(II), Fe(III) and Cu(II), a change in concentration produces a change in electrode potential. FIGS. 4 and 5 represent data taken for Ag(I) and Hg(II) respectively.

It can be seen that for Ag(I) (FIG. 4), there is a nearly linear relationship between pAg and potential response. This experiment was performed in 0.01 N $H_2SO_4$, with saturated calomel as the reference electrode. Concentration of the silver ion was increased regularly and potential measurements were taken one minute following each addition of silver. In order to avoid precipitation of AgCl which might result because of the contribution of chloride ion from the calomel electrode, contact was made between the reference electrode and the solution by means of a salt bridge. From FIG. 4 it is seen that the slope of the linear portion of the pHg—potential graph approximates 59 mv./pAg unit, the value expected from the Nernst equation for a single electron change.

Other curves for the Ag(I) system were obtained using 0.01 M $NaNO_3$ as electrolyte. These curves showed a substantial break or plateau at pAg 3–4, which corresponds to the precipitation of chloride ion present as an impurity in the $NaNO_3$. Thus, the present system could also be applied to the determination of Cl⁻ and perhaps other anions as well.

FIG. 5 is a plot of data obtained for Hg (II). This procedure was carried out in the same manner as the Ag(I) determination, except that the electrolyte was 0.01 M $HNO_3$. The curve is not a simple straight line and some precipitation or complexation may be occurring. The slope was approximately 30 mv./pHg unit, which follows the Nernst equation for a system undergoing a two-electron change.

From experimental results obtained, we postulate, without intending to so limit the invention, that the response mechanism is the reduction of the metal ion at the surface of the electrode. From a consideration of the nature of the tungsten bronzes and their conductivity behavior, this seems to be a reasonable mechanism.

Example III

The electrochemical cells of this invention are also useful in measuring the progress of oxidation-reduction reactions. FIG. 6A shows the results of following the familiar Fe(II)+Ce(IV)=Fe(III)+Ce(III) redox reaction. All solutions were prepared in 0.5 M $H_2SO_4$ to insure constant pH during titration, and the basic cell arrangement of Example I was followed.

Three separate titration curves were obtained for each determination, and a representative series appears in FIG. 6A. The electrode systems were used in conjunction with a voltmeter to yield the data given. The electrode systems used were bronze vs. calomel for curve 30 in FIG. 6, platinum vs. calomel for curve 31 in FIG. 6, and bronze vs. platinum for curve 33 in FIG. 6A. The bronze electrode used was that described in Example I. Electrode systems 1 and 2 gave normal titration curves 30, 31 with the first system lagging the second system by an increment (identified by the spacing 32) which was maximized in the vicinity of the end point. The third system thus used two active electrodes, and the resulting curve denoted 33 in FIG. 6A represents the difference between the first two systems and takes the shape of a first derivative curve.

This latter development makes it possible to measure the relative differences between the results which would be obtained in measuring the progress of an oxidation-reduction reaction in a chemical system by first measuring the progress across a cell employing an active electrode and a reference electrode and thereafter measuring the progress across a cell employing a bronze electrode as herein described, with the above-mentioned reference electrode. This relative difference plot can now be obtained without actually performing the comparative measurements simply by utilizing a cell having a bronze active electrode in conjunction with a second active electrode. In the present example, the second active electrode is platinum; but it is apparent that other types of electrodes would also suffice.

All of the bronze crystals we have tried have exhibited the response characteristics described above, and this characteristic is therefore thought to be inherent in the crystal structure of the broad class of materials known as bronzes, including, for example, $ReO_3$ which has a cubic crystalline structure.

Having thus described in detail various embodiments of the invention, persons skilled in the art will be able to modify certain of the structure disclosed and to substitute equivalent elements for those described while continuing to practice the principle of the invention, and it is, therefore, intended to cover all such modifications and substitutions as they are embraced within the spirit and scope of the appended claims.

The Claims:

1. Apparatus for measuring the activity of metal ion in a solution, said metal ion having a reduction potential which is positive with respect to the standard hydrogen reduction potential and including Ag(I), Hg(II), and Fe(III), comprising: an indicator electrode contacting said solution and having an active element including a single tungsten bronze crystal of the formula $A_xWO_3$ with $x$ greater than 0 and less than 1 and wherein A is selected from the group consisting of sodium, lithium, potassium, and rubidium; a reference electrode contacting said solution; and means for measuring the potential between said electrodes, said potential being representative of ion activity.

2. The apparatus of claim 1 wherein when A is sodium, the value of $x$ is in the range 0.25 to 0.50 and the crystalline structure is Tetragonal I or $x$ is in the range 0.50 to 0.92 and the crystalline structure is cubic; when A is lithium, $x$ is in the range 0.03 to 0.20 and the crystalline structure is orthorhombic or $x$ is in the range 0.25 to 0.50 and the crystalline structure is cubic, when A is potassium $x$ is in the range 0.23 to 0.33 and the crystalline structure is hexagonal or $x$ is in the range 0.34 to 0.70 and the crystalline structure is Tetragonal I, and when A is rubidium, $x$ is in the range 0.20 to 0.33 and the crystalline structure is hexagonal.

3. Apparatus for measuring the end point of a chemical reaction including first indicator electrode having a potential characteristic; a second indicator electrode having as an active component a single tungsten bronze crystal of the formula $A_xWO_3$ with $x$ greater than 0 and less than 1 and wherein A is selected from the group consisting of sodium, lithium, potassium and rubidium; and exhibiting a potential characteristic displaced relative to said first-named characteristic; and means for measuring the potential difference between said indicator electrodes.

4. The apparatus of claim 3 wherein when A is sodium, the value of $x$ is in the range 0.25 to 0.50 and the crystalline structure is Tetragonal I or $x$ is in the range 0.50 to 0.92 and the crystalline structure is cubic; when A is lithium, $x$ is in the range 0.03 and 0.20 and the crystalline structure is orthorhombic or $x$ is in the range 0.25 to 0.50 and the crystalline structure is cubic, when A is potassium $x$ is in the range 0.23 to 0.33 and the crystalline structure is hexagonal or $x$ is in the range 0.34 to 0.70 and the crystalline structure is Tetragonal I, and when A is rubidium, $x$ is in the range 0.20 to 0.33 and the crystalline structure is hexagonal.

5. In combination, an ion-selective electrode for detecting Ag(I), Hg(II) or Fe(III) in solution including an active element comprising a crystal of tungsten bronze having the general formula $A_xWO_3$ with $x$ greater than 0 and less than 1 and wherein A is selected from the group consisting of sodium, lithium, potassium, or rubidium; a reference electrode contacting said solution; and means for measuring an electrical potential between said electrodes.

6. The apparatus of claim 5 wherein A is sodium, the value of $x$ is in the range 0.25 to 0.50 and the crystalline structure is Tetragonal I or $x$ is in the range 0.50 to 0.92 and the crystalline structure is cubic; when A is lithium, $x$ is in the range 0.03 to 0.20 and the crystalline structure is orthorhombic or $x$ is in the range 0.25 to 0.50 and the crystalline structure is cubic, when A is potassium $x$ is in the range 0.23 to 0.33 and the crystalline structure is hexagonal or $x$ is in the range 0.34 to 0.70 and the crystalline structure is Tetragonal I, and when A is rubidium, $x$ is in the range 0.20 to 0.33 and the crystalline structure is hexagonal.

References Cited

UNITED STATES PATENTS

| | | | |
|---|---|---|---|
| 3,502,506 | 3/1970 | Broyde | 204—290 F |
| 3,431,182 | 3/1969 | Frant | 204—195 M |
| 3,563,874 | 2/1971 | Ross et al. | 204—195 M |

OTHER REFERENCES

"Nonstoichiometric Compounds," Advances in Chemistry Series, No. 39, American Chemical Society, chap. 22, pp. 237–245.

TA-HSUNG, TUNG, Primary Examiner

U.S. Cl. X.R.

204—1 T